Jan. 8, 1935.　　　　C. BOUILLON　　　　1,986,997
TOOL HEAD
Filed Sept. 23, 1933　　2 Sheets-Sheet 2
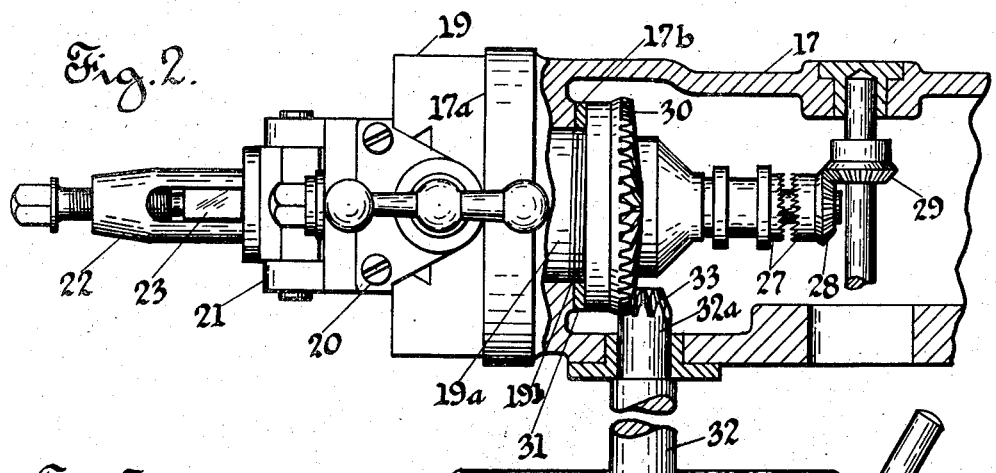
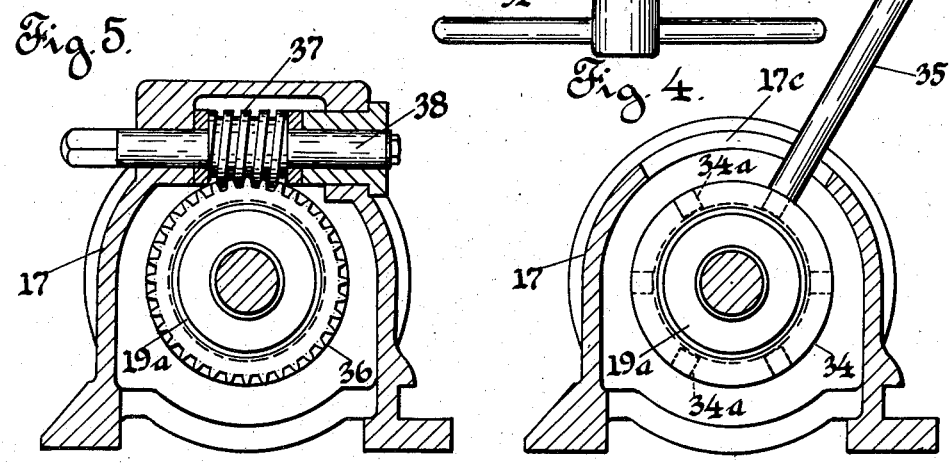
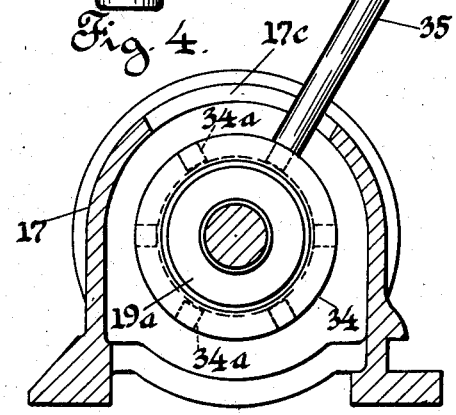
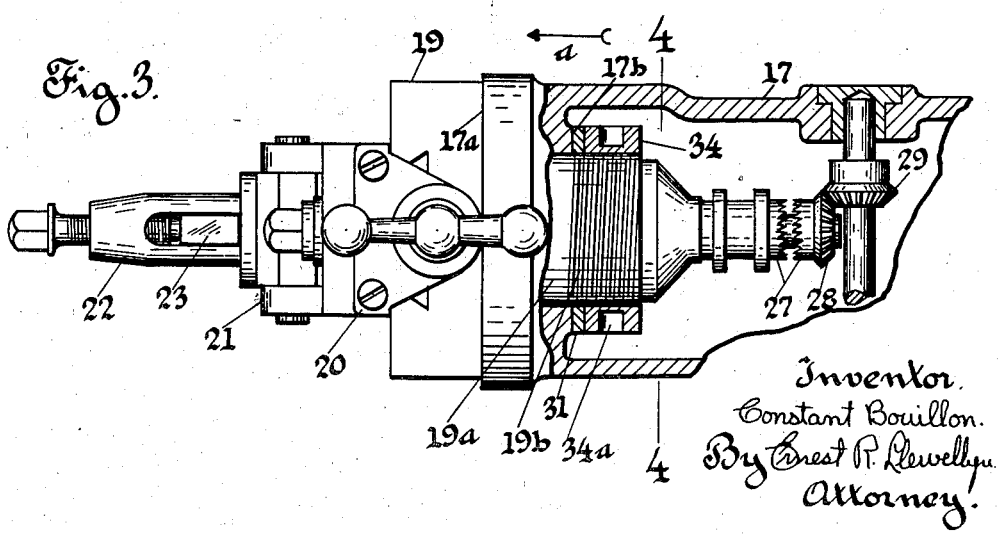
Inventor.
Constant Bouillon.
By Ernest R. Llewellyn
Attorney.

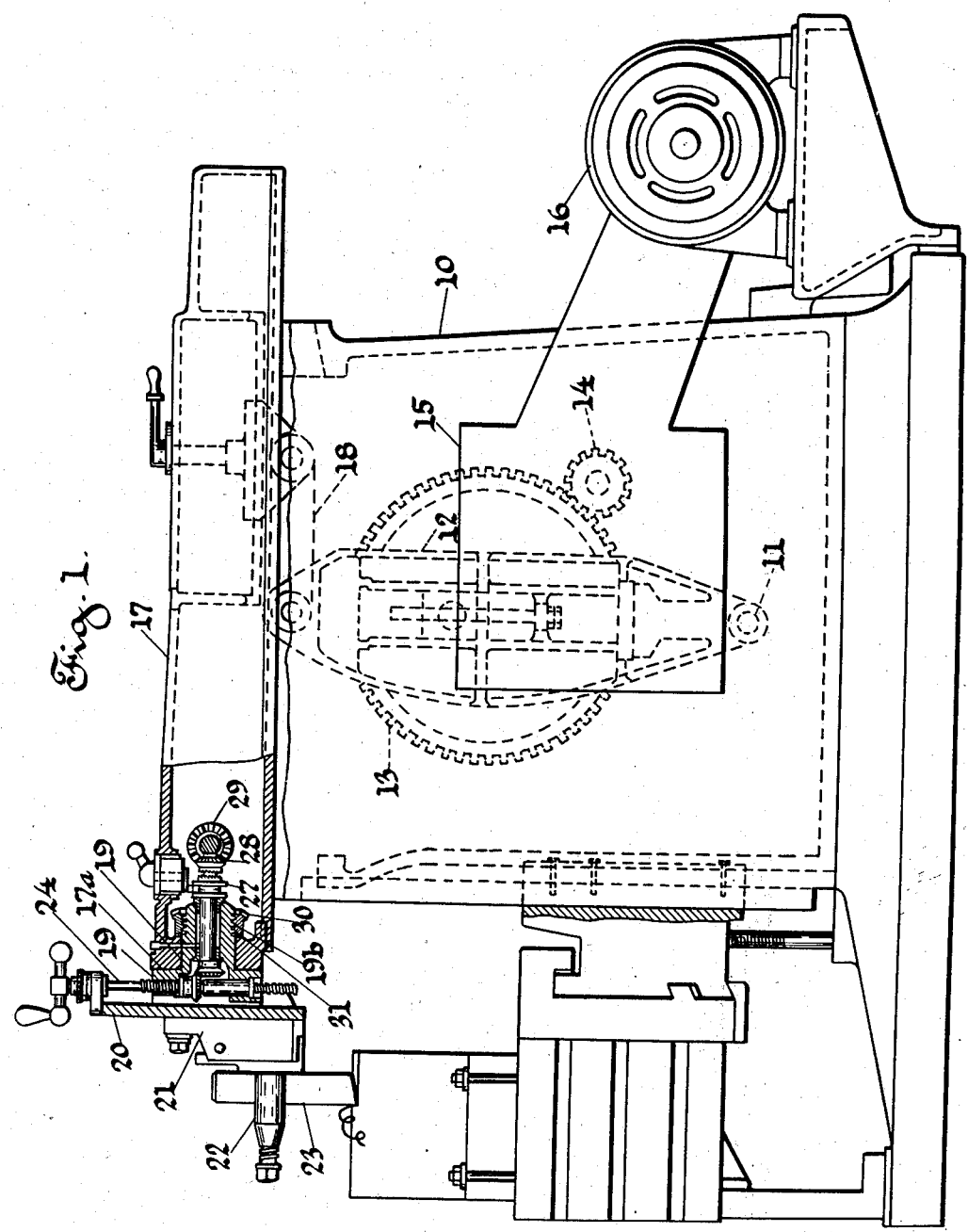

Patented Jan. 8, 1935

1,986,997

UNITED STATES PATENT OFFICE 1,986,997

TOOL HEAD

Constant Bouillon, Torrington, Conn., assignor to The Hendey Machine Company, Torrington, Conn., a corporation of Connecticut Application September 23, 1933, Serial No. 690,746

3 Claims. (Cl. 90—52)

This invention relates to machine tools and more particularly to the cutting tool supporting member.

In performing various operations with machine tools which, while not limited thereto, is typically illustrated as embodied in a reciprocating shaper ram of conventional design, it is necessary to provide means for positioning and positively securing the tool support at various angles. Heretofore, it has been the common practice to secure the tool support with spaced T-bolts and nuts, the bolt heads being permitted to rotate in a circular T-slot formed in a fixed member with which the tool support engages. This construction necessitates the positioning of the clamping nuts on the tool support face which is not always convenient or practical in a desired compact structure, also, clamping devices are commonly used which comprise a wedge element which, in various ways, is actuated between a rotatable tool support or head and the fixed member. This latter clamping method has a tendency to distort the elements, due to the wedging action, which is an undesirable feature with due respect for accuracy.

Accordingly, the object of my present invention is to provide an improved clamping or locking means for a tool head which permits of the tool head being rotated and secured, relative to a fixed member, in any desired position and without the disadvantages above enumerated.

To accomplish the above object, I have provided my tool support with a trunnion suitably mounted in a bearing support and having a portion extending beyond the bearing. This extending portion is provided with a rotatable element adapted to permit a converse longitudinal movement between the rotatable element and the trunnion and to clamp the elements in a desired angular position relative to the bearing or fixed member. Further, my construction permits of a single operating means by which the rotatable member may be actuated to clamp and loosen the elements and also permits of a simplified, compact and effective structure.

With the above and other objects in view my invention comprises a novel combination and arrangement of parts hereinafter described and more specifically pointed out in the appended claims.

In the accompanying drawings I have shown my locking device embodied with a shaper tool head sufficient to enable those skilled in the art to understand the construction and operation thereof.

Referring to the drawings:—

Fig. 1 is a side elevation of a shaper having a reciprocating ram and tool head with my locking device embodied therewith.

Fig. 2 is, on an enlarged scale, a plan view of the ram and tool head, in this view a portion of the ram is shown in section.

Fig. 3 is a view corresponding substantially to Fig. 2, but shows a modified form of construction.

Fig. 4 is a vertical sectional view taken substantially along line 4—4, Fig. 3, and viewing in direction of arrow $a$, same figure.

Fig. 5 is a view corresponding substantially to Fig. 4, but shows a modified form of rotatable member and actuating element.

In this instance I have illustrated a shaper base 10 having pivotally supported therein, at 11, a crank arm 12 which is actuated by the bull gear 13 driven by a pinion 14, said pinion 14 being driven, through the usual change gears contained in a gear box 15, by the prime mover 16. The crank arm 12 is pivotally connected to the ram 17 by a link 18.

The ram 17 has pivotally secured to the outer end thereof, a tool support 19 which engages the end face 17$a$ of the ram. The tool support 19 comprises a slide 20 having a clapper box 21 in which is secured the tool post 22 for the cutting tool 23.

The slide 20 has rotatably mounted therein an adjusting screw 24 and through which the slide is positioned relative to the head. A threaded portion of the screw 24 has rotatably mounted thereon a bevel pinion 25 which meshes with a pinion 26 which forms a part of the automatic down feed actuated through a clutch 27 and bevel gears 28, 29, in the usual and well known manner.

The above described elements and the operation in a shaper are shown for illustrative purposes only and are so well known in the art that further detailed description is thought unnecessary.

I have provided my tool support 19 with a trunnion 19$a$ which is rotatably supported in a suitable bearing in the ram 17. This trunnion 19$a$ is provided with a threaded portion 19$b$ which projects inwardly beyond the bearing. As illustrated at Figs. 1 and 2, I have provided a bevel gear 30 with a threaded bore formed therein and adapted to engage the threaded portion 19$b$ of the trunnion. A thrust washer 31 is interposed between the end face of the bevel gear hub and the inner face of the trunnion bearing. The removable wrench 32 is provided with a reduced portion 32a adapted to be inserted and supported in a suitable bearing in the ram, the inner end of said portion 32a terminating in a pinion 33 which is adapted to engage with the teeth of the gear. After the elements have been actuated by the wrench, the wrench may be removed and thus eliminating an undesirable projection when the ram is reciprocated.

As the gear 30 is rotated in a clockwise direction, by the pinion 33, on the threaded portion 19, the inner face of the tool support 19 is forced into a tight engagement with the end face 17a of the ram and the washer is forced into engagement with the inner face of 17b of the bearing, thus locking the tool support 19 in a desired radial position relative to the fixed support or ram.

At Fig. 4, I have shown a modified form of rotating element for the threaded portion 19b of the trunnion 19a and which, in this instance, comprises a collar 34 having an internally threaded bore adapted for threaded engagement with the trunnion. This collar 34 is provided with a plurality of radial openings 34a adapted to receive one end of a handle 35 which is inserted, through a slot 17c, in the ram, into the openings 34a to rotate the collar which will function as the gear 30 above described.

At Fig. 5, I have illustrated a worm gear 36 having an internally threaded bore adapted for threaded engagement with the trunnion. The worm 37 meshes with the gear and through the rotation of the worm shaft 38 the gear 36 is actuated to function as the gear 30 to clamp the tool support 19 to the end face 17a.

Having thus described my invention it will be evident that may changes and modifications may be made therein by those skilled in the art without departing from the spirit and scope thereof, and also my clamping device may be embodied with tool supports of various constructions, therefore I do not wish to be limited to the specific details herein disclosed, but, what I claim is:—

1. A tool holder comprising a relatively fixed member having a bearing with opposed end faces and a substantially hollow body portion adjacent one of said end faces, a rotatable member having a trunnion adapted to engage in and extend beyond said bearing and into said body portion, a rotatable member adapted to engage said trunnion extension with means for rotating said last member and whereby said second member is fixedly retained relative to said bearing.

2. A tool holder comprising a relatively fixed member having a bearing and a substantially hollow body portion adjacent one of said end faces with opposed end faces; a flange member adapted to engage one end face of said bearing; a trunnion integral with said flange member and adapted to engage in said bearing, said trunnion having a threaded portion extending beyond the opposed end face of said bearing and into said body portion; a rotatable member adapted to engage said threaded portion whereby rotation of said last member will retain said flange member in a fixed position relative to said bearing.

3. A tool holder comprising in combination, a substantially flanged head, a slide adjustably secured to said head, a clapper box adjustably secured to said slide and having a cutting tool supported therein, a trunnion integral with said head and having a threaded end portion, a bearing for said trunnion said bearing having opposed end faces with a substantially hollow body portion adjacent one of said end faces, a rotatable member adapted to engage said threaded end portion within said body portion with means for rotating said member whereby said head is retained in a fixed angular position relative to said bearing.

CONSTANT BOUILLON.